US007596777B2

(12) United States Patent
Fallen-Bailey et al.

(10) Patent No.: US 7,596,777 B2
(45) Date of Patent: Sep. 29, 2009

(54) METHOD AND APPARATUS TO CONTROL TRANSLATABLE PROPERTIES OF METADATA

(75) Inventors: Tim Fallen-Bailey, Foster City, CA (US); Mark C. Hastings, Palo Alto, CA (US); Bharat Jindal, S. F., CA (US); Jayant Kulkarni, Sunnyvale, CA (US); Vipul Shroff, Sunnyvale, CA (US); Peter A. Thorson, Oakland, CA (US)

(73) Assignee: Siebel Systems, Inc., San Mateo, CA (US)

( * ) Notice: Subject to any disclaimer, the term of this patent is extended or adjusted under 35 U.S.C. 154(b) by 451 days.

(21) Appl. No.: 10/180,586

(22) Filed: Jun. 25, 2002

(65) Prior Publication Data

US 2007/0226687 A1 Sep. 27, 2007

(51) Int. Cl.
G06F 9/44 (2006.01)
G06F 9/45 (2006.01)
G06F 17/28 (2006.01)
G06F 17/20 (2006.01)
G06F 17/27 (2006.01)

(52) U.S. Cl. .................. 717/103; 717/105; 717/137; 704/5; 704/8; 707/9

(58) Field of Classification Search ......... 717/168–178, 717/113, 105, 110; 707/511, 514; 715/511; 713/182
See application file for complete search history.

(56) References Cited

U.S. PATENT DOCUMENTS

| 5,220,657 | A  | * | 6/1993  | Bly et al. ................. 711/152 |
| 5,251,315 | A  | * | 10/1993 | Wang ............................ 707/8 |
| 5,255,389 | A  | * | 10/1993 | Wang ........................... 707/10 |
| 5,526,524 | A  | * | 6/1996  | Madduri ..................... 710/200 |
| 5,623,659 | A  | * | 4/1997  | Shi et al. ....................... 707/8 |
| 5,678,040 | A  | * | 10/1997 | Vasudevan et al. ............ 707/8 |
| 6,026,401 | A  | * | 2/2000  | Brealey et al. ................. 707/8 |
| 6,035,121 | A  | * | 3/2000  | Chiu et al. .................. 717/141 |
| 6,094,654 | A  | * | 7/2000  | Van Huben et al. ............ 707/8 |
| 6,275,935 | B1 | * | 8/2001  | Barlow et al. ............... 713/182 |
| 6,466,900 | B1 | * | 10/2002 | Lissauer et al. ................ 704/7 |
| 6,523,033 | B1 | * | 2/2003  | Holt et al. ...................... 707/8 |
| 6,529,909 | B1 | * | 3/2003  | Bowman-Amuah .......... 707/10 |
| 6,675,384 | B1 | * | 1/2004  | Block et al. .................. 725/28 |
| 6,782,529 | B2 | * | 8/2004  | Kumhyr ..................... 717/111 |
| 6,868,425 | B1 | * | 3/2005  | Bergstraesser et al. .. 707/103 R |
| 2002/0065848 | A1 | * | 5/2002 | Walker et al. ............... 707/511 |
| 2002/0144253 | A1 | * | 10/2002 | Kumhyr .................... 717/170 |
| 2002/0165885 | A1 | * | 11/2002 | Kumhyr et al. ............. 707/536 |
| 2003/0093457 | A1 | * | 5/2003 | Goldick ..................... 709/104 |
| 2004/0107405 | A1 | * | 6/2004 | Schein ....................... 715/530 |
| 2006/0206866 | A1 | * | 9/2006 | Eldrige et al. ............... 717/122 |

* cited by examiner

*Primary Examiner*—Tuan Q Dam
*Assistant Examiner*—Isaac T Tecklu
(74) *Attorney, Agent, or Firm*—Campbell Stephenson LLP

(57) ABSTRACT

A method and apparatus for providing a translation locking mechanism comprising a locking system to permit locking of translatable properties of an object within a project. The apparatus further comprises a lock tester to determine whether the locking system prevents edits to a particular property; and an editing tool to prohibit alteration of the properties that are affected by translation.

21 Claims, 8 Drawing Sheets

Object Type 1           Translation Flag
    Property
        Location
        Caption
        Size
        Comment Object Type 2           Translation Flag
    Property
        Location
        Comment

| Object Type | Editing Operation | Permitted | Prohibited |
|---|---|---|---|
| Object Type 1 | Edit Location property | X | |
| | Edit Caption | | X |
| | Edit Size | | X |
| | Edit Comment | X | |
| | Delete Object | X | |
| | Add New Object | X with caption left blank | |
| Object Type 2 | ANY | X | |
| Object Type N | Localizable Property | | X |
| | All Other Properties | X | |

Fig. 8

_METHOD AND APPARATUS TO CONTROL TRANSLATABLE PROPERTIES OF METADATA_

FIELD OF THE INVENTION

This invention relates generally to localization of computer-based applications, and more particularly to locking localized content.

BACKGROUND

Computer-based applications generally contain textual data that is presented to a user to allow the user to interact with the applications. The textual data is written in a human language, usually the native language of the country of the developer or a common language, such as English. When the application is destined for use in other countries, typically the textual data is manually translated into the various local languages as part of a process commonly referred to as "localization." Application metadata is used to store the structure and format of user forms, reports, queries, and other application components. This type of metadata may be stored in a repository. The human language user interface data is referred to as localizable metadata within the application metadata. The translation of the metadata may then take place.

However, translation and re-translation are time consuming, expensive, and require a long lead-time. Therefore, performing any actions that require a retranslation after a translation has been performed is highly inefficient. Even minor changes to the repository may include changes to translatable properties of an object, thereby requiring another expensive pass through the metadata to perform a retranslation.

One prior art solution freezes the entire repository or project after translation. This prevents any changes from being made, thereby preventing the need for retranslation. However, it prevents any changes to the repository/project near the end of a release. Therefore, this solution is not optimal.

SUMMARY OF THE INVENTION

A method and apparatus for implementing a translation lock is disclosed. The translation lock prevents changes to translatable properties of an object, when the translation lock is on.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 illustrates one embodiment of a usage policy that may be defined in connection with the translation lock.

DETAILED DESCRIPIMON

A method and apparatus for a translation lock is described. The translation lock, placed by a supervisor, prevents changes to translatable properties of an object. Translatable properties are properties that are affected by the language being used, and would likely require retranslation if changed. Since retranslation is expensive and time-consuming, this process makes the localization of software applications faster and cheaper. By only locking down those objects that are affected by localization, and for one embodiment only those properties of objects that are directly affected, programmers and others can alter the data in other ways. Therefore, the development process can continue, without impacting the translation cycle. A property of an object that is not a translatable property may be referred to herein as a "non-translatable property."

Figure 1:
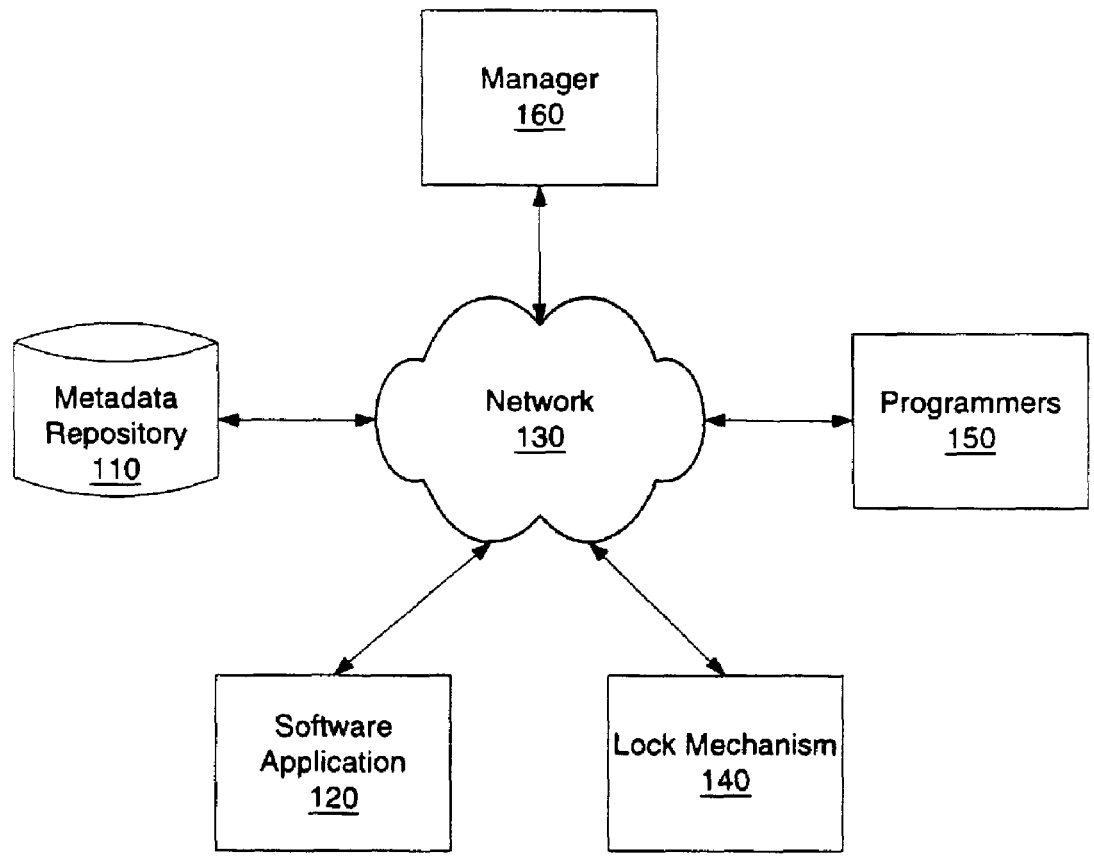
FIG. 1 is a block diagram of a network in which the present invention may be implemented.

FIG. 1 illustrates one embodiment of a network in which the present invention may be used. The system includes a software application 120. The software application 120 is designed to interact with users (not shown). The software application 120 uses data from metadata repository 110 to present user interface elements to the user. The use of such metadata to present customized information to a user is known in the art. For one embodiment, metadata repository 110 and software application 120 are coupled directly, or may be located on the same computer system. For another embodiment, metadata repository 110 and software application 120 may be coupled through network 130. Network 130 may be a local area network (LAN), wide area network (WAN), the Internet, or any other type of network.

The metadata, for one embodiment, may be in the user's native language. Thus, the metadata repository 110 may store the information presented to the user in various languages, permitting customization.

Programmers 150 create and modify the software application 120 to create new released products, and to correct any bugs. The programmers, in their editing, often alter data in the repository 110 to alter displays of the software program 120. A manager 160 may use lock mechanism 140 to place a translation lock on a project within the software program 120 or the repository 110. The translation lock prevents the programmers 150 from changing data that affects portions of the metadata that would require retranslation. For example, if the software program displays options to the user to "acknowledge" a display or "exit the program," the translation lock may prevent the programmer 150 from altering the text in the option. For one embodiment, the size of the button displaying the option may also be locked, since the size is affected by the language. Thus, for example, a programmer 150 may alter the size of a display button, not realizing that the display button's size is required because in another language the label is larger. Thus, by using the translation lock, a manager 160 or programmer 150 may lock the portions of the metadata that are affected by a language change. For one embodiment, the user who placed the translation lock may make alterations that affect translation.

Although FIG. 1 illustrates these connections between the repository 110, software application 120, manager 160, and programmers 150 as being made through a network 130. However, one of skill in the art understands that these connections may be made directly, through internal networks, or that these elements and the individuals may access the system through a single computer, which includes the software 120 and repository 110.

Figure 2:
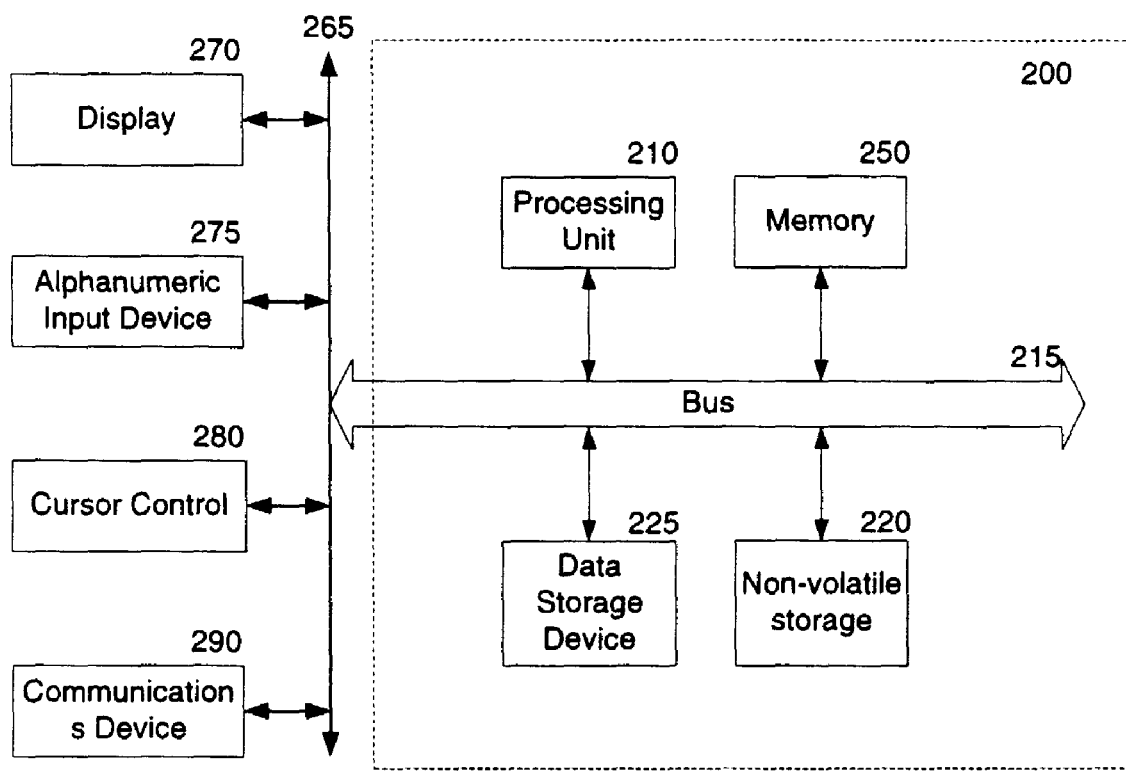
FIG. 2 is a block diagram of a computer system that may be used with the present invention.

FIG. 2 is one embodiment of a computer system that may be used with the present invention. It will be apparent to those of ordinary skill in the art, however that other alternative systems of various system architectures may also be used.

The data processing system illustrated in FIG. 2 includes a bus or other internal communication means 215 for communicating information, and a processor 210 coupled to the bus 215 for processing information. The system further comprises a random access memory (RAM) or other volatile storage device 250 (referred to as memory), coupled to bus 215 for storing information and instructions to be executed by processor 210. Main memory 250 also may be used for storing temporary variables or other intermediate information during execution of instructions by processor 210. The system also comprises a read only memory (ROM) and/or static storage device 220 coupled to bus 215 for storing static information and instructions for processor 210, and a data storage device 225 such as a magnetic disk or optical disk and its corresponding disk drive. Data storage device 225 is coupled to bus 215 for storing information and instructions.

The system may further be coupled to a display device 270, such as a cathode ray tube (CRT) or a liquid crystal display (LCD) coupled to bus 215 through bus 265 for displaying information to a computer user. An alphanumeric input device 275, including alphanumeric and other keys, may also be coupled to bus 215 through bus 265 for communicating information and command selections to processor 210. An additional user input device is cursor control device 280, such as a mouse, a trackball, stylus, or cursor direction keys coupled to bus 215 through bus 265 for communicating direction information and command selections to processor 210, and for controlling cursor movement on display device 270.

Another device, which may optionally be coupled to computer system 200, is a communication device 290 for accessing other nodes of a distributed system via a network. The communication device 290 may include any of a number of commercially available networking peripheral devices such as those used for coupling to an Ethernet, token ring, Internet, or wide area network. The communication device 290 may further be a null-modem connection, or any other mechanism that provides connectivity between the computer system 200 and the outside world. Note that any or all of the components of this system illustrated in FIG. 2 and associated hardware may be used in various embodiments of the present invention.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 210.

It will be apparent to those of ordinary skill in the art that the system, method, and process described herein can be implemented as software stored in main memory 250 or read only memory 220 and executed by processor 210. This control logic or software may also be resident on an article of manufacture comprising a computer readable medium having computer readable program code embodied therein and being readable by the mass storage device 225 and for causing the processor 210 to operate in accordance with the methods and teachings herein.

The present invention may also be embodied in a handheld or portable device containing a subset of the computer hardware components described above. For example, the handheld device may be configured to contain only the bus 215, the processor 210, and memory 250 and/or 225. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 210, a data storage device 225, a bus 215, and memory 250, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 210. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Figure 3:
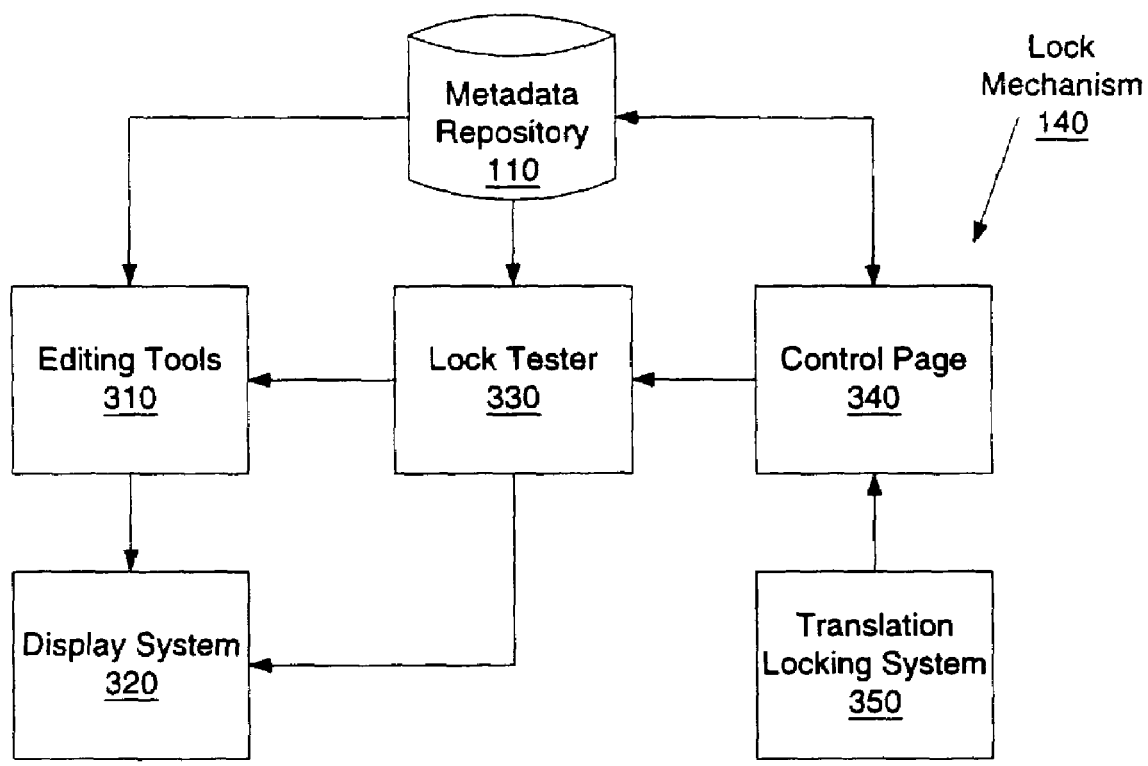
FIG. 3 is a block diagram of one embodiment of a translation lock.

FIG. 3 is a block diagram of one embodiment of the system that may be used to implement the lock mechanism 140. The editing tools 310 are used by various programmers and others to alter the software program. The editing tools 310 use the metadata from repository 110. The display system 320 displays the data to the programmer.

Lock tester 330 determines whether a project, or an object within a project is translation locked. For one embodiment, the translation lock is applied on a per-project basis. For another embodiment, the translation lock may be applied on a per-object basis. For a third embodiment, the translation lock may be applied on an object type basis, a per-screen basis, or any other basis. The translation lock, while applied to the entire project/object only affects the translatable properties of individual objects.

For one embodiment, lock tester 330 continuously tests whether or not a translation lock has been applied. For another embodiment, lock tester 330 may test for the translation lock when a project is checked out for editing. Generally, in order to prevent conflicting changes being made to data, one user checks out the data from the common repository, for editing. That user, by checking out the data, puts a "project lock" on the data, preventing anyone else from changing the data. However, others may view the data, for one embodiment. For another embodiment, the lock tester 330 tests whether any changes have been made to the translation locked data, when data is checked in. As noted above, a user checks out a set of data for edits, to prevent others from making incompatible changes. The user, upon completion of the changes, checks the changed dataset back in. For one embodiment, the lock tester 330 prevents check-in if any of the translation locked properties have been altered.

Figures 7A, 7B:
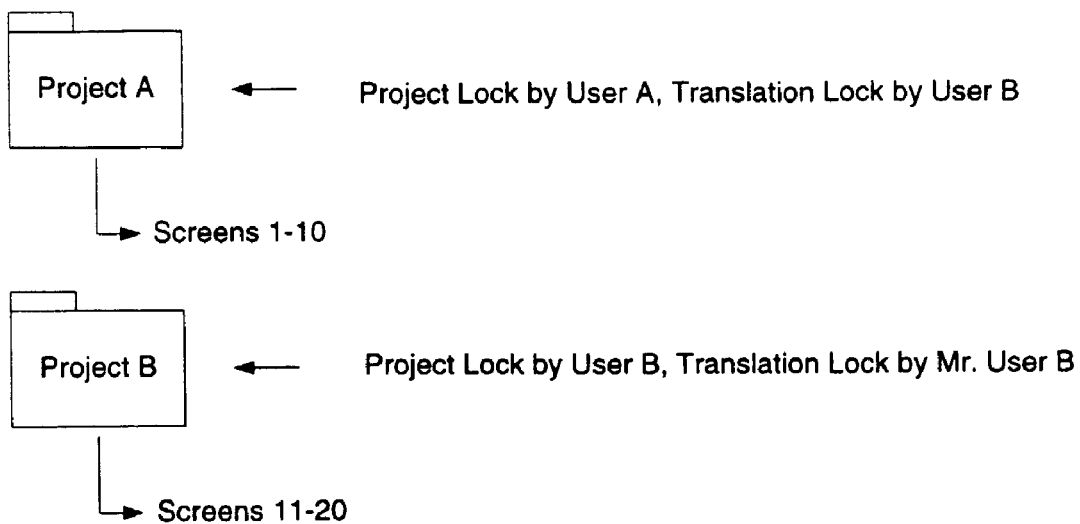
FIGS. 7A and 7B illustrate one embodiment of implementing a translation lock and translation flags.

For one embodiment, locked properties may be altered by the user who locked them. FIG. 7A illustrates one embodiment of such a locking mechanism. There are a number of projects, each of which may include multiple screens. A screen, in this instance, is a collection of objects of various types. Each project may have two attributes. The attributes include a Project Lock and a Translation Lock. Each lock, if active, may be associated with an individual user.

For example, Project 1 is illustrated as having a Project Lock by User A, and a Translation Lock by User B. Thus, Project 1 may be edited, except for translatable properties of an object, by User A. No one else may make any changes to Project 1, including User A. For example, Project 2 is illustrated as having a Project Lock by User B, and a Translation Lock by User B. This means that the only person who may make any changes to Project 2 is User B, but User B may make changes that require retranslation.

As discussed above, in an alternate embodiment, the Translation lock may be applied on a per object, per screen, or another basis.

For one embodiment, the lock tester 330 determines whether the user is the same as the person who applied the translation lock to the project. If so, the translation lock does not apply, and the user is permitted to make any alteration.

For one embodiment, each object on a page has associated with it an entry in control page 340. The entry in control page 340 identifies which properties of the object, if any, are affected by translation. If a translation lock is active, those properties of the object are not accessible for change. Of course, if the identity of the person who locked the data is the same as the current user, this rule does not apply.

For one embodiment, the objects/properties that are not accessible for change are indicated by display system 320. For one embodiment, non-alterable objects/properties may be dimmed, may be non-selectable, may be a different color, or may be indicated in some other way.

Locking system 350 permits an authorized individual to place a translation lock on a project, object, screen, or other unit of data. For one embodiment, the locking system 350 includes a list of the individuals authorized to use the translation lock. For one embodiment, the individuals authorized to use the translation lock may vary by project. For one embodiment, the translation lock simply indicates that an object is locked. As shown in FIG. 7B, each object type includes one or more properties, ranging from size to caption and location. A "translation flag" on any property of an object type indicates that the property is influenced by translation. Thus, when the translation lock is on, the property may not be changed, except by the authorized person who placed the translation lock.

In this way, the present system permits an authorized individual to translation lock a project, while permitting programmers and others to make changes that do not affect translatable properties of objects. This means that bugs in the code itself may be fixed, even after the project is locked from a translation perspective.

Figure 4:
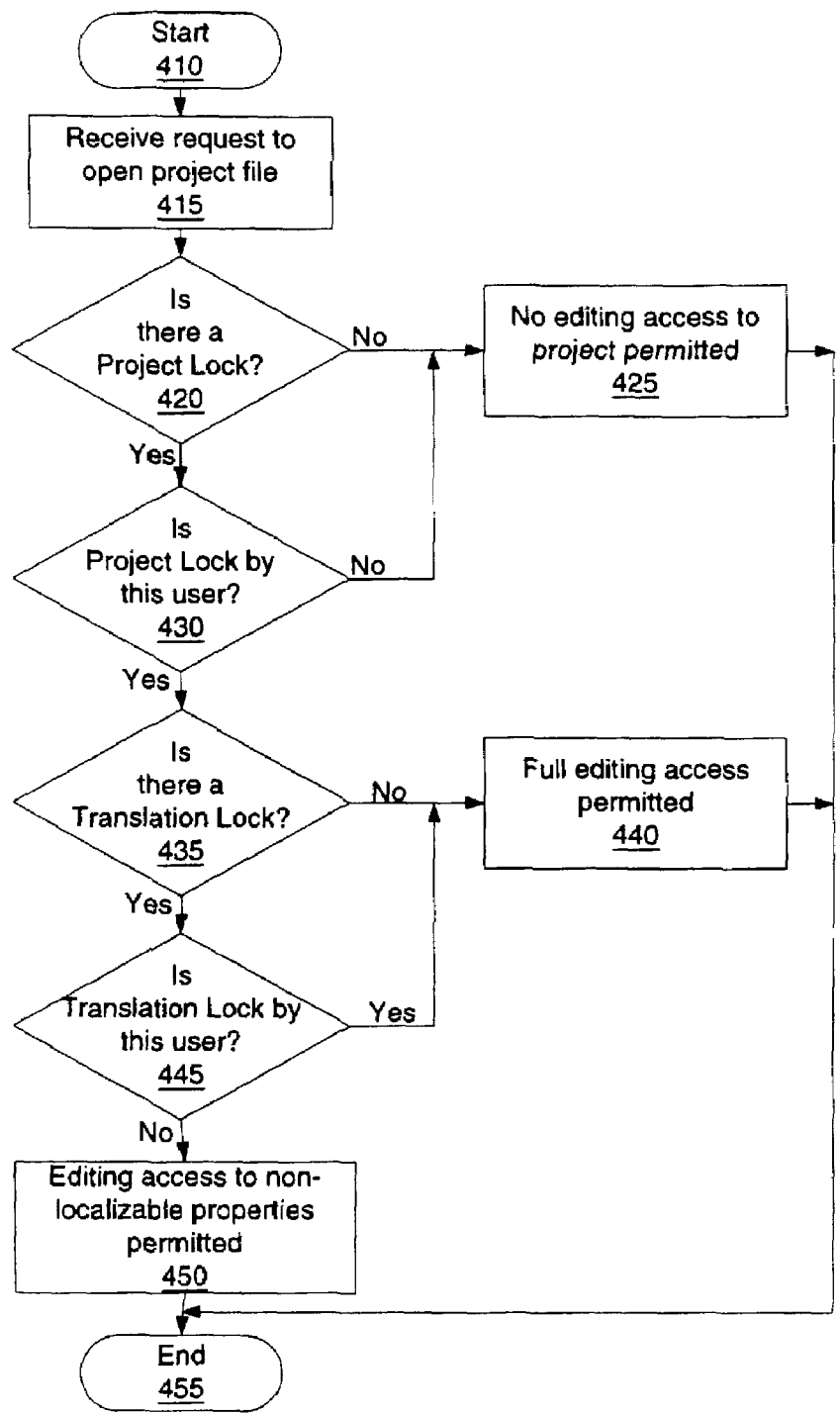
FIG. 4 is a flowchart of one embodiment of using a translation lock.

FIG. 4 is a flowchart of one embodiment of editing a project. The process starts at block 410, when a user requests access to a project. At block 415, the request to open the project for editing is received.

At block 420, the process determines whether the project is locked with a project lock. A project lock identifies the individual who may edit a project. If the project is not locked, the process continues to block 425. At block 425, the process prohibits all changes to the project. For one embodiment, the user may view the project, but may not make changes. The process then ends at block 455.

If the project is locked, the process continues to block 430. At block 430, the process determines whether the project is locked by this user. This user may project lock a project upon checking it out. For one embodiment, the system automatically checks out the project to the user, if the project is available.

If the project is not locked by this user, the process continues to block 425, permitting only non-editing access to the project. If the project is locked by this user, the process continues to block 435.

At block 435, the process determines whether there is a translation lock on the project. If there is no translation lock, the process continues to block 440. At block 440, the user is permitted to make all alterations. For one embodiment, the process continues to block 443, and continuously tests whether a translation lock has been applied to the project. If a translation lock has been applied to the project, the process continues to block 445. Otherwise, the user is permitted to make all alterations.

If there is a translation lock, the process continues to block 445. At block 445, the process determines whether the translation lock was applied by this user. The user that applies the translation lock may make changes that require retranslation. If the user who applied the translation lock is this user, the process continues to block 440, and full access including permission of all alterations is provided.

If the translation lock was applied by another user, the process continues to block 450. At block 450, the user is permitted access to the project, and permitted to make alterations that do not require retranslation. For one embodiment, these changes may include deleting objects. However, the user may not add new objects that affect the user interface, since the translatable properties of such objects would require retranslation. The process then ends at block 455.

Thus, the determination, based on two elements, project lock and translation lock, is as follows:

| Project Lock | Translation Lock | Access Level |
| --- | --- | --- |
| Unlocked | Either | No alteration permitted |
| Locked by another | Either | No alteration permitted |
| Locked by user | Unlocked or Locked by user | All alterations permitted |
| Locked by user | Locked by another user | Alterations not requiring Retranslation permitted |

Figure 5:
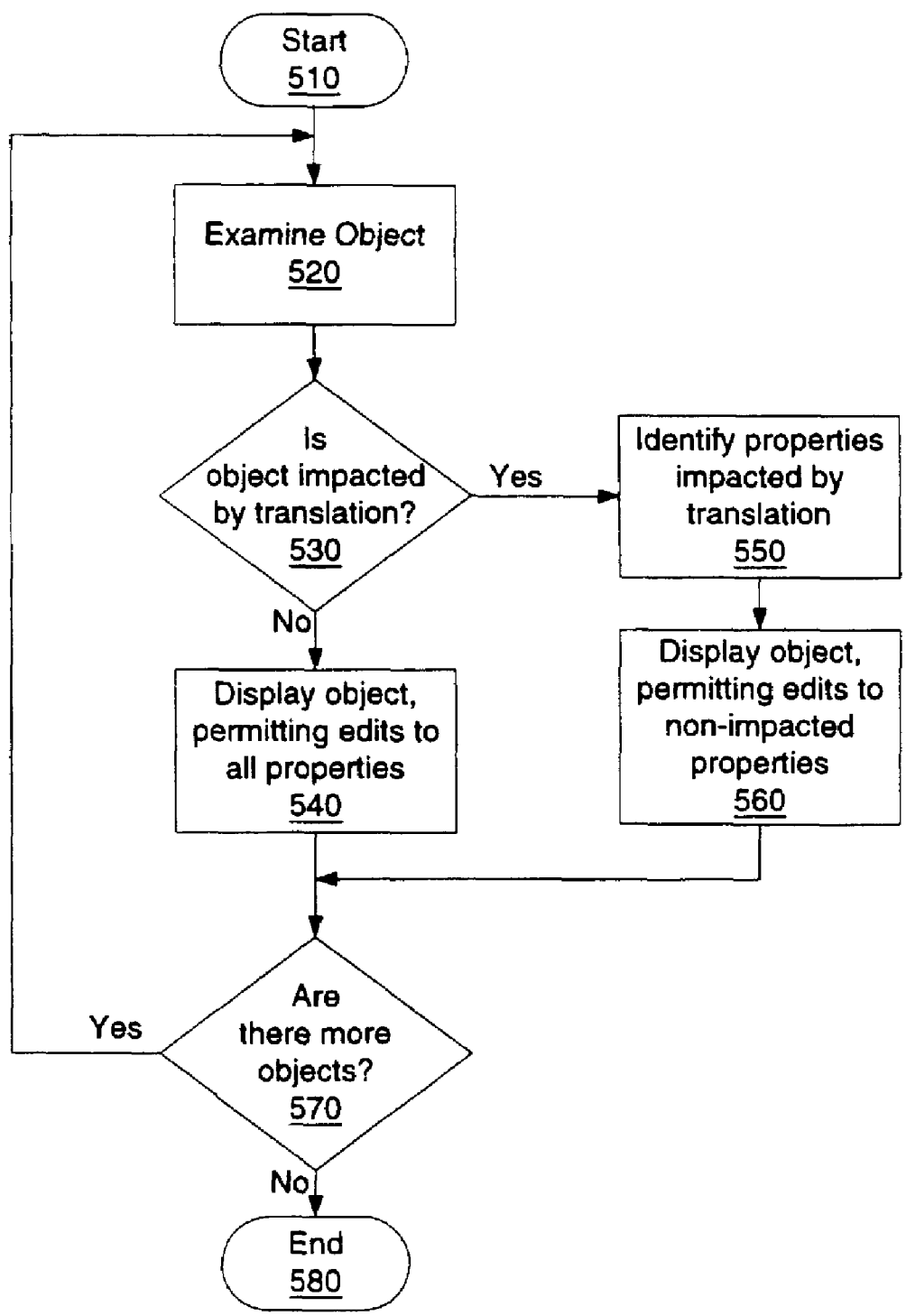
FIG. 5 is a flowchart of one embodiment of displaying data that is locked with a translation lock.

FIG. 5 is a flowchart of one embodiment of presenting data that is has a translation lock locked by another user. The translation locking thus prevents changes to any properties that would require retranslation. The process starts at block 510. This process corresponds to block 450, permitting access when the project lock is by the user, and the translation lock is by another.

At block 520, an object is examined to determine whether it is impacted by translation. FIG. 7B illustrates an exemplary control file that provides this information. As can be seen, object 1 includes four properties. In this example, the properties include location, caption, size, and comment. A translation flag is associated with each localizable property of object 1. As can be seen, the caption and size of object 1 are affected by translation. Thus, if a translation lock is placed upon this object, a user could not alter the caption and size of the object, while being able to alter all other aspects of the object.

Returning to FIG. 5, if the object is not impacted by translation—e.g. none of the properties of the object have a translation flag—as determined at block 530, the process continues to block 540. At block 540, the object is displayed permitting editing of all of its properties. The process then continues to block 570.

If the object is impacted by translation, at block 530, the process continues to block 550. At block 550, the process identifies those properties that are impacted by translation, e.g. have translation flags associated with them.

At block 560, the object is displayed with the impacted properties being flagged as unchangeable. For one embodiment, the flagging may be by graying out the properties. For another embodiment, the flag may be by preventing changes to the property. For another embodiment, the flag may be alerting the user if the user attempts to change the impacted property. Alternative means of preventing alterations to impacted properties may be used. The process then continues to block 570.

At block 570, the process determines whether there are any more objects to be examined. If there are more objects to evaluate, the process returns to block 520, to examine the next object. If no more objects remain, the process ends at block 580.

Figure 6:
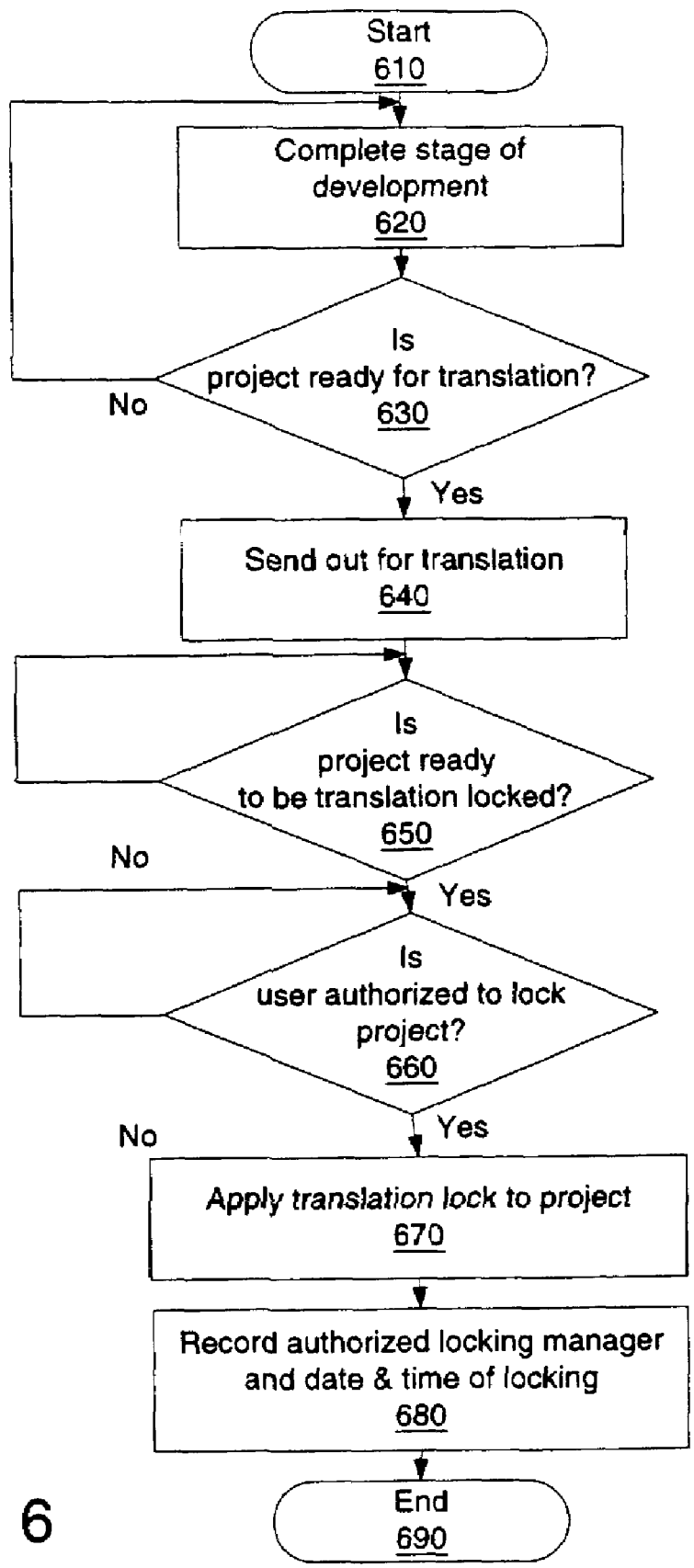
FIG. 6 is a flowchart of one embodiment of applying a translation lock to a project.

FIG. 6 is a flowchart of one embodiment of performing a translation lock. The process starts at block 610. For one embodiment, this process runs continuously during the development. Note that although the process is illustrated as a flowchart, various events may take place in different orders.

At block 620, a stage of development is completed. At block 630, the process determines whether the project is ready for translation. For one embodiment, this decision is made by a manager. If the project is not yet ready for translation, the process returns to block 620, to complete a next stage of development. If the project is ready for translation, the process continues to block 640.

At block 640, the data that is presented to the user is sent out for translation. For one embodiment, the translation may be performed by computer-based translation systems. For another embodiment, human translators may be used. Alternatively, a combination of computer-based and human translators may be used. For one embodiment, the data may be sent out for translation at the end of the process—e.g. after block 680—such that the project is first locked and then the data is sent out for translation.

At block 650, a user determines whether the project is sufficiently ready to apply a translation lock. The translation lock is applied, for one embodiment, after all translations are completed, and the affected objects are adjusted to handle the translated components. For another embodiment, the translation lock is applied before the information is sent out to be translated.

At block 660, the process determines whether the user is authorized to apply a translation lock. For one embodiment, only certain managers are permitted to apply a translation lock. Therefore, the process determines whether the user is one of the authorized managers. If not, the process returns to block 650.

If the user is authorized to translation lock the system, at block 670, the translation lock is applied to all translatable properties. For one embodiment, the translation lock is applied to the project, and the lock tester identifies the properties that are locked when a particular sheet or project portion is opened for editing. For another embodiment, the translation lock may be applied to an entire software application, an object, a screen, or another grouping of objects.

At block 680, the authorized locking manager's name is recorded. For one embodiment, the time and date that the translation lock is applied is also recorded. The process then ends at block 690.

FIG. 8 illustrates one embodiment of a usage policy that may be defined in connection with the translation lock. As can be seen, the user may make no changes that may affect any properties that are localized (e.g. locale based properties). However, other types of changes, e.g. deleting objects, and changing non-locale properties, is permitted. For one embodiment, the policy may further prohibit users from deleting locale data for any language. In general, locale data includes the various translations for a localizable property of an object. Once the translation lock has been put in place, such locale rows may not be deleted. Furthermore, the system may prohibit copying a record with localizable data into a project. For another embodiment, copying a record or object into a project may be permitted, if the localizable properties of object being copied have been translated. In other words, if the new object does not require a translation, since the translation has already been performed, then such copying may be permitted.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A translation locking mechanism comprising:
  a lock tester, wherein
    the lock tester is stored in a computer-readable storage medium,
    the lock tester is configured to execute on a processor coupled to the computer-readable storage medium,
    the lock tester determines whether a translation lock prohibits changes to translatable properties of an object without locking non-translatable properties of the object,
    the object is part of a software application,
    the translatable properties comprise data and metadata affected by a language translation,
    the metadata comprises information about user interface elements,
    the lock tester is further configured to
      determine whether alterations have been made to locked translatable properties of the object contained in a changed dataset being checked-in, and
      prevent checking-in of the changed dataset when the changed dataset comprises unacceptable alterations to locked translatable properties of the object, and
    the unacceptable alterations require retranslation of at least one of the locked translatable properties of the object;
  an editing tool, wherein
    the editing tool is stored in the computer-readable storage medium,
    the editing tool is configured to execute on the processor,
    the editing tool is configured to permit changes to non-translatable properties of the object even though the translation lock prohibits changes to be made to the translatable properties; and a display system, coupled to the processor and configured to display data,
  identify data that is not editable, and
  alert a user when the locked tester determines that the changed dataset comprises unacceptable alterations to locked translatable properties of the object.

2. The translation locking mechanism of claim 1, wherein the translation lock is applied on a per-object basis.

3. The translation locking mechanism of claim 1, wherein the translation lock is applied on a per project basis.

4. The translation locking mechanism of claim 1, further comprising:
  the lock tester to determine an identity of a user that translation locked the object; and
  if the identity of the user matches a current user's identity, the lock tester to permit editing access to all data having translatable properties.

5. The translation locking mechanism of claim 1, wherein the display system dims out data that is not editable.

6. The translation locking mechanism of claim 1, wherein the display system does not permit a user to select any data that is not editable.

7. The translation locking mechanism of claim 1, wherein the lock tester continuously tests whether a property of an object is editable.

8. The translation locking mechanism of claim 1, wherein the lock tester determines whether a property of a project is editable when the project is checked-out for editing.

9. The translation locking mechanism of claim 1, wherein the translation locking mechanism is configured to allow addition of another object containing corresponding translatable properties into the software application only upon completion of translation of the corresponding translatable properties prior to the addition.

10. A method comprising:
  receiving a request to edit a project that is part of a software application, wherein
    the project comprises a plurality of objects,
    each object of the plurality of objects comprises translatable properties and non-translatable properties,
    the translatable properties comprise data and metadata affected by a language translation, and
    the metadata comprises information about user interface elements;
  determining whether a translation lock has been applied to at least a portion of the project, wherein
    the at least the portion of the project comprises one or more of the plurality of objects;
  if the translation lock has been applied to the at least the portion of the project,
    prohibiting alteration of the translatable properties of at least one object of the one or more of the plurality of objects,
    allowing editing of the non-translatable properties of each object of the plurality of objects, and
    allowing editing of the translatable properties of at least one object of the plurality of objects, wherein
      the at least one object of the plurality of objects is other than the one or more of the plurality of objects;
  further determining whether alterations have been made to locked translatable properties of a first object of the plurality of objects when a changed dataset containing the first object is checked-in;
  preventing checking-in of the changed dataset when the changed dataset comprises unacceptable alterations to locked translatable properties of the first object, wherein the unacceptable alterations require retranslation of at least one of the locked translatable properties;
  displaying data for the software application on a display system and, in the displayed data, identifying non-editable data associated with those objects to which the translation lock has been applied; and
  alerting a user through the display system when the changed dataset comprises the unacceptable alterations.

11. The method of claim 10, wherein the translation lock is applied on a per-object basis.

12. The method of claim 10, wherein the translation lock is applied on a per project basis.

13. The method of claim 10, further comprising:
  determining an identification of who locked the portion of the project; and
  if the identification of who locked the portion of the project matches a current user's identity, permitting the current user an editing access to all locked data.

14. The method of claim 10, wherein the data that is not editable is dimmed out.

15. The method of claim 10, further comprising preventing a user from selecting any data that is not alterable.

16. The method of claim 10, further comprising:
  continuously testing whether a property is editable.

17. The method of claim 10, further comprising:
  testing whether a property is editable when a project is checked-out for editing.

18. The method of claim 10, further comprising:
  allowing addition of a second object containing corresponding translatable properties into the project only upon completion of translation of the corresponding translatable properties prior to the addition.

19. A computer program product comprising:
  a computer readable physical storage medium having the following sets of instructions encoded therein:
  a first set of instructions, executable on a computer system, configured to receive a request to edit a project that is part of a software application, wherein
    the project comprises a plurality of objects comprising translatable properties and non-translatable properties,
    the translatable properties comprise data and metadata affected by a language translation, and
    the metadata comprises information about user interface elements;
  a second set of instructions, executable on the computer system, configured to determine whether a translation lock has been applied to at least a portion of the project containing one or more of the plurality of objects;
  when the translation lock has been applied, a third set of instructions, executable on the computer system and configured to prohibit alteration of the translatable properties of those objects to which the translation lock has been applied, and further configured to allow editing of the non-translatable properties of all of the plurality of objects and to allow editing of the translatable properties of only those objects to which the translation lock has not been applied;
  a fourth set of instructions, executable on the computer system, configured to determine whether alterations have been made to locked translatable properties of a first object of the plurality of objects when a changed dataset containing the first object is checked-in;
  a fifth set of instructions, executable on the computer system, configured to prevent checking-in of the changed dataset when the changed dataset comprises unacceptable alterations to locked translatable properties of the first object, wherein the unacceptable alterations require retranslation of at least one of the locked translatable properties;

a sixth set of instructions, executable on the computer system, configured to display data for the software application on a display system and further configured to identify, in the displayed data, non-editable data associated with those objects to which the translation lock has been applied; and a seventh set of instructions, executable on the computer system, configured to alert a user through the display system when the changed dataset comprises unacceptable alterations to locked translatable properties of the first object.

20. The method of claim 10, further comprising:
identifying a translatable property of an object using a translation flag.

21. The computer program product of claim 19, further comprising:
an eighth set of instructions, executable on the computer, configured to allow addition of a second object containing corresponding translatable properties into project only upon completion of translation of the corresponding translatable properties prior to the addition.

* * * * *

UNITED STATES PATENT AND TRADEMARK OFFICE
CERTIFICATE OF CORRECTION

| | | |
|---|---|---|
| PATENT NO. | : 7,596,777 B2 | Page 1 of 1 |
| APPLICATION NO. | : 10/180586 | |
| DATED | : September 29, 2009 | |
| INVENTOR(S) | : Tim Fallen-Bailey et al. | |

It is certified that error appears in the above-identified patent and that said Letters Patent is hereby corrected as shown below:

Title Pg, (*) Notice: delete "451 days" and insert -- 725 days --.

In column 2, line 5, delete "DESCRIPIMON" and insert -- DESCRIPTION --, therefor, In column 12, line 11, in claim 21, delete "into" and insert -- into the --, therefor.

Signed and Sealed this

Seventeenth Day of August, 2010

David J. Kappos
*Director of the United States Patent and Trademark Office*